United States Patent
Melton

(10) Patent No.: US 10,355,540 B2
(45) Date of Patent: Jul. 16, 2019

(54) MAGNETIC DRIVE ENHANCEMENT

(71) Applicant: BlueGranite Media, Crossville, TN (US)

(72) Inventor: J. George Melton, Crossville, TN (US)

(73) Assignee: BLUEGRANITE MEDIA, Crossville, TN (US)

( * ) Notice: Subject to any disclaimer, the term of this patent is extended or adjusted under 35 U.S.C. 154(b) by 943 days.

(21) Appl. No.: 14/885,496

(22) Filed: Oct. 16, 2015

(65) Prior Publication Data

US 2017/0110915 A1    Apr. 20, 2017

(51) Int. Cl.
| | |
|---|---|
| H02K 1/17 | (2006.01) |
| H02K 11/01 | (2016.01) |
| H02K 53/00 | (2006.01) |
| H02K 99/00 | (2014.01) |

(52) U.S. Cl.
CPC .............. *H02K 1/17* (2013.01); *H02K 11/01* (2016.01); *H02K 99/20* (2016.10); *H02K 53/00* (2013.01); *Y10S 74/09* (2013.01)

(58) Field of Classification Search
CPC ...... H02K 53/00; H02K 49/106; H02K 21/00; H02K 1/17; H02K 21/04; H02K 1/06; H02K 49/04; H02K 49/043; H02K 49/104; H02K 99/20; H02K 11/01; Y10S 74/09
USPC .................. 310/152, 216.108, 103, 104, 105
See application file for complete search history.

(56) References Cited

U.S. PATENT DOCUMENTS

| | | | | |
|---|---|---|---|---|
| 4,459,500 A | * | 7/1984 | Miyamoto ............. | H02K 23/04 310/154.21 |
| 4,587,449 A | * | 5/1986 | West ........................ | H02K 1/17 310/154.15 |
| 2010/0156222 A1 | * | 6/2010 | Jung ...................... | H02K 7/025 310/152 |
| 2012/0104905 A1 | * | 5/2012 | Prudham ................ | H02K 1/146 310/68 B |
| 2013/0049509 A1 | * | 2/2013 | Shin ........................ | H02K 21/00 310/152 |
| 2015/0222149 A1 | * | 8/2015 | Nakamura ................ | F03G 7/10 310/152 |

FOREIGN PATENT DOCUMENTS

KR    20070007412 A  *  1/2007

OTHER PUBLICATIONS

Byoung Chang Yeop, Electric Motor using Permanent Magnet, Jan. 16, 2007, KR 20070007412 (English Machine Translation).*

* cited by examiner

*Primary Examiner* — Bernard Rojas
*Assistant Examiner* — Alexander A Singh
(74) *Attorney, Agent, or Firm* — Merchant & Gould

(57) ABSTRACT

A magnetic drive enhancement is provided to offset kinetic forces found in a rotational system to improve the mechanical efficiency of the rotational system. A housing includes rotationally biased magnetic fields in which a central axle or driveshaft may rotate. The magnetic fields are generated, shaped, and rotationally biased by a plurality of driving magnets and magnetic shields. Attached to the driveshaft are magnetic receivers, which are influenced by the rotationally biased magnetic fields at varying strengths as they orbit within the housing. The magnetic fields are shaped to provide increasing and decreasing strength of flux to counteract the physical forces experienced by the driveshaft to thereby increase the efficiency of the rotational system.

3 Claims, 5 Drawing Sheets

MAGNETIC DRIVE ENHANCEMENT

BACKGROUND

The application of electromagnetism is an underpinning of modern technology, however, outside of electric motors and magnetic levitation, electromagnetism has found little application in conjunction with or in opposition to of kinetic forces. In part, this is due to electromagnetic forces diminishing exponentially with distance, and the large energy requirements for creating powerful electromagnets and dearth of sufficiently powerful permanent magnets.

SUMMARY

The present disclosure uses a shaped magnetic flux field to affect the motion of a rotating driveshaft. The flux fields are bent into areas of high or low flux through which magnetic receivers in operable communication with the driveshaft move as the driveshaft rotates. By shaping the magnetic flux fields appropriately in contradiction to the kinetic force profile of the driveshaft, the resting position of the driveshaft is disturbed such that the kinetic motion of the driveshaft is improved. As will be understood, the kinetic force profile for a rotational system represents the mechanical forces that affect the rotation of the system (e.g., external clockwise forces, external counterclockwise forces, inertia, friction).

Multiple magnets are arranged within a housing to combine their flux fields to act in concert on the receivers. The housing includes both magnetic conductors and magnetic insulators to shape the arrangement of the flux field, both within and outside of the housing. As the driveshaft imparts kinetic energy on the receivers as its rotates, the receivers move within the housing and are acted upon by the fields of the magnets to impart magnetic pulls and pushes on the driveshaft, which enables the rotation of the driveshaft to be enhanced by imparting the contradictory force profile of the flux field within the housing.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
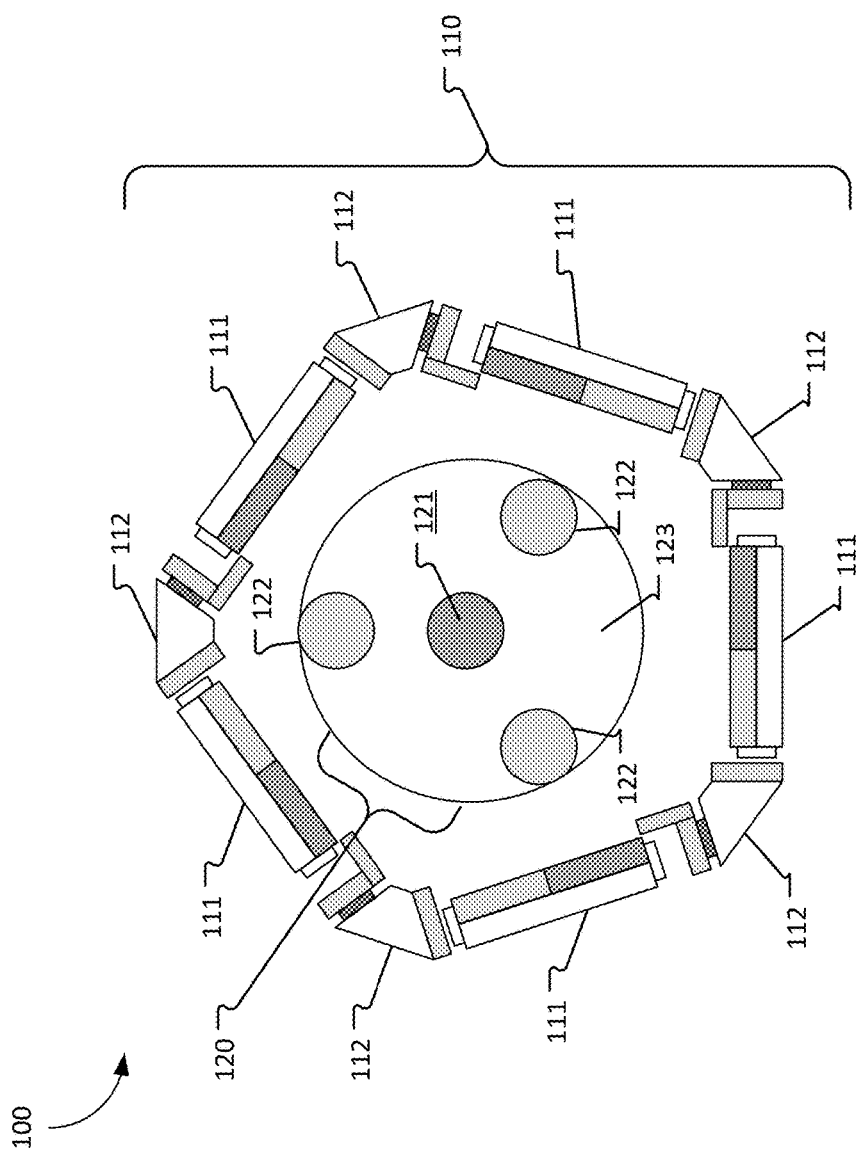
FIG. 1 illustrates an example cut-away view showing several components in an example magnetic drive enhancement.

The following detailed description refers to the accompanying drawings, and wherever possible, the same reference number is used to refer to the same or similar element. Aspects of the present disclosure may be described herein with the understanding that modifications, adaptation, and other implementations are possible. For example, substitutions, additions, or modifications may be made to the elements illustrated in the drawings. Accordingly, the following detailed description does not limit the present disclosure, but rather, the proper scope of the present disclosure is defined by the appended claims. The following detailed description, therefore, is not to be taken in a limiting sense.

The transfer of electromagnetic and magnetic forces discussed in the present disclosure provides a plethora of practical use cases that improve the efficiency of various rotational systems as either an integral component of those systems or a retrofit to existing systems. For example, as a modular attachment for an existing engine shaft, the present disclosure provides an effective enhancement to existing rotary motor systems that does not require an additional fuel source or monitoring equipment. Using the present disclosure, one of ordinary skill in the art would be able to find applications in various rotating systems, including, but not limited to: turbo-propeller engines, turbo-shafts, electrical turbines, permanently placed motors such as those found in industrial machinery, wheeled vehicle (including trailers) axels, etc. Additionally, the present disclosure may be applied as a kinetic assistor for charging devices to improve their efficiency.

FIG. 1 illustrates an example cut-away view showing several components in an example magnetic drive enhancement 100. Although a given number of components are illustrated in FIG. 1, one of skill in the art will appreciate that a different number of components may be used in other aspects without departing from the concept of the present disclosure. The magnetic drive enhancement 100 includes a drive housing 110 comprising at least one driver block 111 (see, FIG. 2) and a rotational member 120 (see, FIG. 5).

The drive housing 110 includes a plurality of driver blocks 111 and spacers 112. Driver blocks 111 are magnetic assemblies, discussed in greater detail in FIG. 2, and spacers 112 are either non-magnetic assemblies used to physically link the driver blocks 111, or gaps (e.g., air gaps or shielding) between the driver blocks 111 when the driver blocks 111 are physically linked by one or more butt plates in the plane which the illustrated magnetic drive enhancement 100 has been cross-sectioned.

Driver blocks 111 are arranged in the drive housing 110 in a non-parallel fashion so that no one driver block 111 completely faces another one driver block 111. Although illustrated in a pentagonal arrangement, other non-parallel arrangements of driver blocks 111, using more or fewer driver blocks 111 (e.g., linear, triangular, heptagonal, hendecagonal, x-polygonal) are possible. As more driver blocks 111 are used, more precise magnetic control can be exercised over the motion of the rotational member 120. In one aspect, the number of driver blocks 111 used are matched to the number of teeth used in a gearing to drive the rotational member 120.

A driver block 111 produces a variable strength magnetic field along its length to impart on the rotational member 120 via a magnetically induced motion in the direction of travel of the rotational member 120. All the driver blocks 111 that comprise the drive housing 110 are all aligned in the same direction, such that the magnetic field in the drive housing 110 is biased for clockwise or counterclockwise rotation to match the rotational direction of the rotational member 120. For example, when the rotational member 120 is intended primarily for clockwise rotation, the magnetic field within the drive housing 110 is also biased for clockwise rotation.

Although not illustrated herein, electromagnets may be activated or deactivated when desired to reduce or strengthen the fields generated by permanent magnets, such as, for example, when the rotational system is run in reverse. For example, the driver blocks 111 may rotationally bias the drive housing 110 for clockwise rotation via permanent magnets, which is counteracted for a reduced clockwise rotational bias (or overwhelmed for no or counterclockwise rotational bias) by activating electromagnets included in the driver blocks 111. Alternatively, the magnetic receivers 122 may comprise electromagnets or be in communication with electromagnets to reduce or increase the effect that the driver blocks 111 impart on the magnetic receivers 122.

The rotational member 120 spins within the cavity defined by the drive housing 110 about a driveshaft 121. In various aspects, the driveshaft 121 is operably connected to an engine or motor that imparts a rotational force on the driveshaft 121 via a gearing arrangement or a crankshaft. The driveshaft 121 is centered in the drive housing 110 and is uniformly affected by the magnetic fields generated by the driver blocks 111.

At least one magnetic receiver 122, offset from the driveshaft 121, is operably connected to the driveshaft 121 to improve the kinetic motion of the driveshaft 121. The magnetic receiver 122 is either a magnet or made of a magnetic material that is affected by the magnetic fields generated by the driver blocks 111. The magnetic receivers 122 pass through varying strengths of flux as they orbit within the drive housing 110 and will be alternatively pushed or pulled towards the magnets generating that flux. The effect of the magnetic fields is imparted on the magnetic receiver 122 as the rotational motion of the driveshaft 121 causes it to orbit the driveshaft 121 within the drive housing 110, which the magnetic receiver 122 in turn imparts as a kinetic force on the driveshaft 121.

In various aspects, the number of magnetic receivers 122, their distance from the central axis of the driveshaft 121, and their distance from each other varies. In the illustrated example, three magnetic receivers 122 are shown, all equidistant from the driveshaft 121 and equidistant from each other. In other aspects, a number of magnetic receivers 122 may be equal to the number of driver blocks 111. In yet other aspects, a number of magnetic receivers 122 may be equal to the number of teeth in a gearing assembly used to impart a rotational force on the driveshaft 121, for example, by an engine in communication with the driveshaft 121. One of skill in the art will understand that by varying the number and positioning of the magnetic receivers 122, different force profiles may be applied to the driveshaft 121 as it causes the magnetic receivers 122 to orbit. For example, a single magnetic receiver 122 (or an unevenly spaced grouping of magnetic receivers 122) may be used to induce a wobble on the force profile of the driveshaft 121 (e.g., to counteract a force from a cam operating a cam receiver). By varying the number and spacing of magnetic receivers 122 and driver blocks 111 to oppose the force profile of a rotational system (e.g., an engine, a generator) communicated to the driveshaft 121 (e.g., via a crank or gearing assembly) the magnetic force profile counteracts the rotational system's force profile to smooth the rotational motion (e.g., to reduce acceleration and jerk as the system overcomes mechanically induced friction).

The magnetic receivers 122 are operably connected to the driveshaft 121 via a connector 123. An example of how the magnetic receivers 122 are connected to the driveshaft 121 is discussed in greater detail in FIG. 5. The connector 123 serves to offset the magnetic receivers 122 from the driveshaft 121. In some aspects, the connector 123 may be a spur or arm from the driveshaft 121 to which the magnetic receiver 122 is connected. In other aspects, an existing driveshaft 121 is outfitted with a connector 123. A connector 123 may be secured to the driveshaft 121 using gaskets, cotter pins, clips, adhesives, welding/brazing, and/or friction. As will be understood, multiple connectors 123 may be connected to the driveshaft 121 along its length to provide multiple receivers 122 along the length of the driveshaft 121 as well as, or instead of, multiple receiver along the circumference of the driveshaft 121.

As will be understood, including several iterations of magnetic receivers 122 along the length of the driveshaft 121 can result in different torsional forces being applied to the driveshaft 121 along its length. One of skill in the art would be able to vary the magnetic strength of the driver blocks 111, the distances between the magnetic receivers 122 and the driver blocks 111, the number and spacing of the magnetic receivers 122 relative to one another, the size and/or strength of the magnetic receivers 122, and the spacing of the iterations of magnetic receivers 122 to affect different torsional forces on the driveshaft 121.

Figure 2:
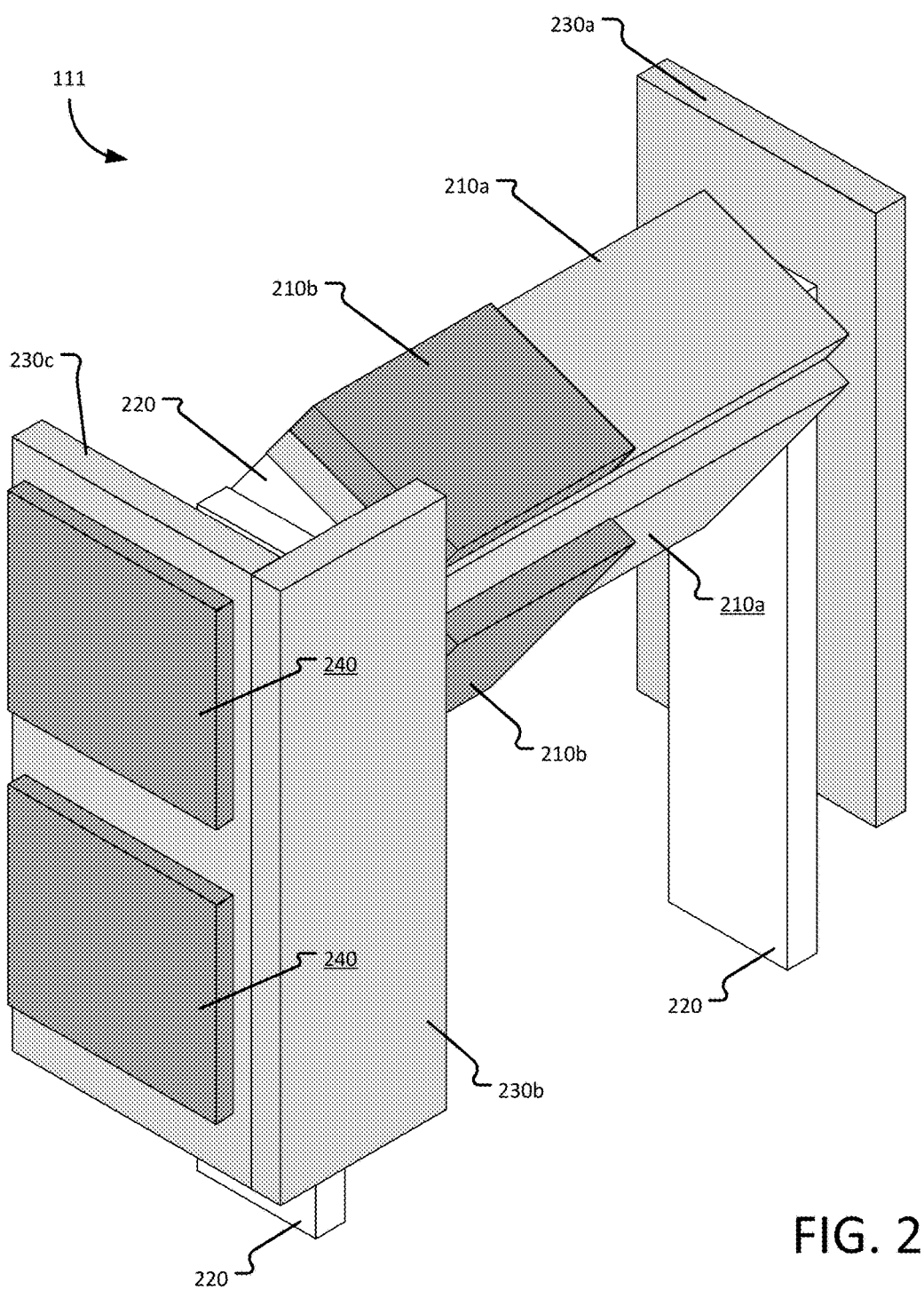
FIG. 2 illustrates an isometric view of an example driver block.

FIG. 2 illustrates an isometric view of an example driver block 111. Although the illustrated components are discussed as part of the driver block 111, one of skill in the art will recognize that some of the components may be integrated into a casing or a spacer 112 for the drive housing 110. One of skill in the art will also recognize that more or fewer components may be used, and alternative shapes for the components are possible. FIG. 2 is presented for purposes of a non-exhaustive explanation within the present disclosure.

Driving magnets 210, including the first driving magnet 210a and a second driving magnet 210b, are used to generate shaped magnetic fields through which the magnetic receivers 122 will travel. The first driving magnet 210a is affixed to a support 220, and second driving magnet 210b is affixed to first driving magnet 210a. The second driving magnet 210b is affixed to the first driving magnet 210a so that the flux fields of the driving magnets 210 are combined (i.e., the magnetic poles of the first driving magnet 210a and second driving magnet 210b are aligned). The second driving magnet 210b is connected by the opposite magnetic pole to the first driving magnet 210a (e.g., north to south or south to north) so that the magnetic field produced along the length of the driving magnets 210 is stronger (excluding the effects of flux shaping) where the first driving magnet 210a is connected to the second driving magnet 210b. As will be understood, more than two driving magnets 210 may be used in other aspects, and that by using more driving magnets 210, the granularity of magnetic field strength changes may be increased. In the illustrated example, the second driving magnet 210b is half the length of the first driving magnet 210a. The first driving magnet 210a and the second driving magnet 210b may have the same or different magnetic strengths in various examples.

As illustrated, two sets of driving magnets 210 are affixed to a support 220, although one of skill in the art will recognize that the support 220 may be constructed in other ways, such as, for example, an arm extending from a casing for a drive housing 110. The support 220 serves to align the faces of the driving magnets 210 comprising the driver block 111 so that the fields generated by the driving magnets 210 are oriented to properly engage the magnetic receivers 122 in their orbits. As will be understood, permanent magnets may be comprised of various magnetic materials (e.g., iron, $SmCo_5$, $Nd_2Fe_{14}B$), having various magnetic strengths and physical properties selected to match the intended use of the magnetic drive enhancement 100. As will also be understood, electromagnets are comprised of a core, which may be magnetic or non-magnetic (including air), and a conductive coil, wound around the core, through which electricity flows to produce a magnetic field, and the polarity and strength of the magnetic field may be varied by the direction and magnitude of the current running through the coil. The magnets discussed herein may be permanent magnets, electromagnets, and combinations of permanent and electromagnets. The support 220 also positions the magnetic shields 230 relative to the magnetic elements of the driver block 111. A leading magnetic shield 230*a* and a trailing magnetic shield 230*c* serve to insulate the driver blocks 111 from each other and to limit the effect of a given driver block 111 on a magnetic receiver 122 once it has passed the driving magnets 210 of the given driver block 111 in its orbit. A pathway magnetic shield 230*b* is connected to the trailing magnetic shield 230*c*, and serves to create an area of low flux (also referred to as a breaking field schism) at the trailing edge of the driver block 111. The face of the pathway magnetic shield 230*b* is perpendicular to the faces of the leading magnetic shield 230*a* and trailing magnetic shield 230*c* so that it is substantially concentric to the orbit of the magnetic receiver 122.

Figure 3:
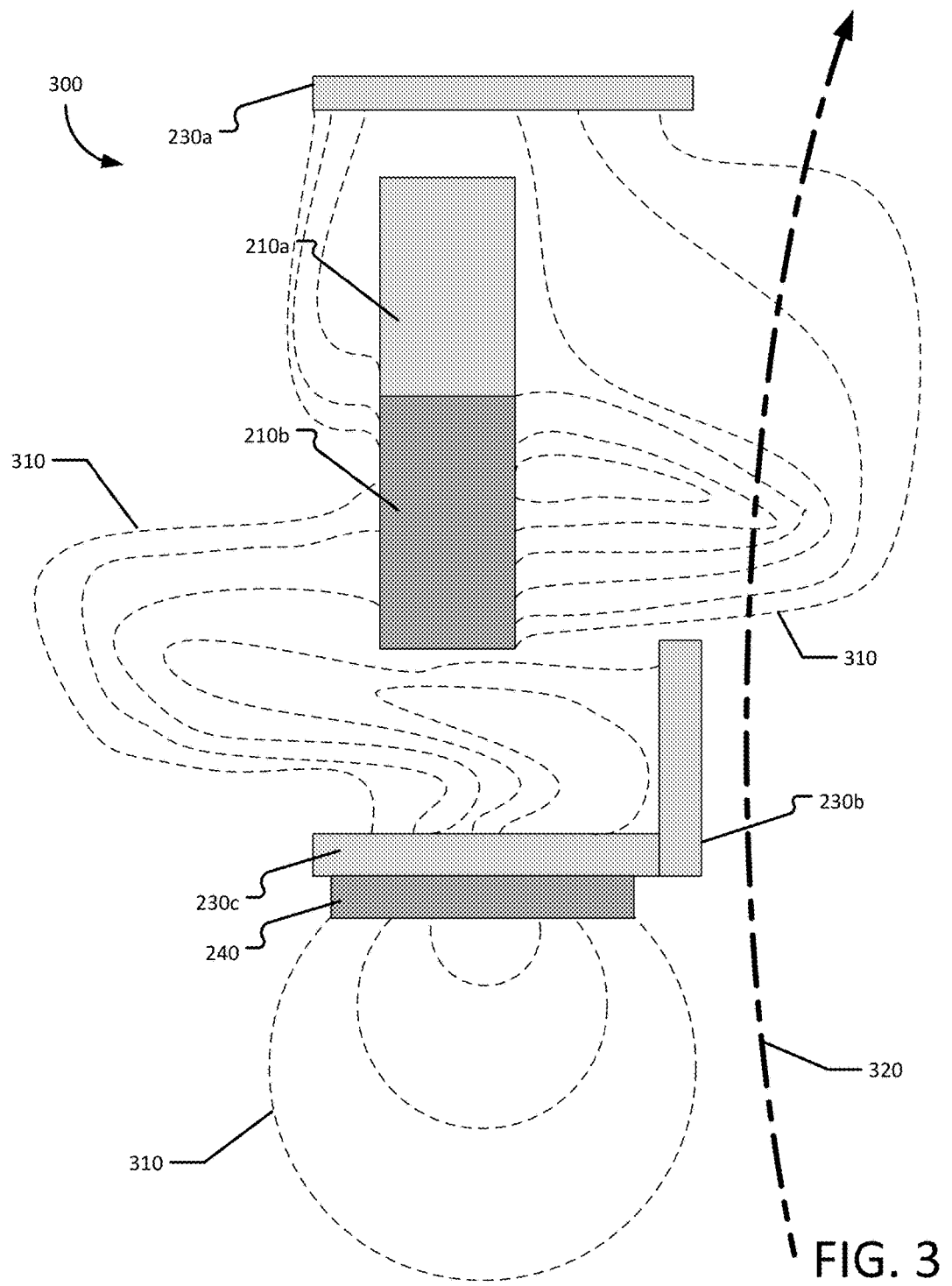
FIG. 3 is an example flux diagram for a top-down view of a driver block.

As will be understood, the orbit of the magnetic receiver 122 is circular, and as such cannot be truly parallel to a planar face, as it will approach and retreat from a planar face over the course of its orbit. As will be understood, the planar face, because it is planar, does not describe an arc of a circle, and thus cannot be truly part of a concentric circle to the orbit of the magnetic receiver 122. Additionally, the planar face does not intersect the orbit of the magnetic receiver 122, and thus is not truly tangential to the orbit. The term "substantially concentric" therefore should be understood to describe a system in which an orbit runs along the length of a planar face (as illustrated in FIG. 3) without intersection the planar face, and if the planar face were curved along its length, the cross section in the orbital plane would to form an arc of a concentric circle to the orbital course of the magnetic receiver 122 (having a radius greater than the orbital radius of the magnetic receiver 122, but having the same center as the orbital radius of the magnetic receiver 122).

In various aspects, the magnetic shields 230 may be arranged differently than illustrated, for example, the trailing magnetic shield 230*c* and the pathway magnetic shield 230*b* may be a single construction, the pathway magnetic shield 230*b* may be attached to the support 220 instead of the trailing magnetic shield 230*c*, or the pathway magnetic shield 230*b* may be connected to the leading magnetic shield 230*a*.

As will be understood, magnetic shields 230 are comprised of materials that are weakly magnetic (or paramagnetic) with high relative magnetic permeabilities, and cause the magnetic fields generated by the magnetic portions of the driver block 111 to bend through the magnetic shields 230 by providing a path for the magnetic flux around areas where the fields are not desired. Magnetic shields 230 may be comprised of various materials having various magnetic permeabilities and physical characteristics (e.g., Cobalt-Iron, Mu-metals) selected to match the intended use of the magnetic drive enhancement 100, and a magnetic shield 230 may comprise several layers of materials (of the same or different material) to combat saturation of the magnetic shield 230.

In various aspects, optional arresting magnets 240 are attached to the magnetic shields 230 (illustrated on the trailing magnetic shield 230*c*) with an opposing polarity to the driving magnets 210 to further align the magnetic fields generated by the driving magnets 210. Arresting magnets 240 may be attached to any of the magnetic shields 230 to direct the flux toward the center of mass of the driver block 111 to concentrate the combined fluxes of the driver block 111 to more effectively impart forces on the magnetic receivers 122, as shown in the flux diagrams in FIGS. 3 and 4.

FIG. 3 is an example flux diagram 300 for a top-down view of a driver block 111. In the flux diagram 300, the driving magnets 210, and arresting magnets 240 illustrated in FIG. 2 are illustrated with their the flux lines 310, represented by the dashed lines, showing the magnetic field strengths of an example driver block 111. Also illustrated are the magnetic shields 230 shown in FIG. 2, which impede and shape the magnetic fields generated by the magnets. As will be understood, each flux line 310 represents a pathway having an equivalent flux value along the flux line 310, and flux lines 310 interior to other flux lines 310 represent higher flux values than the exterior flux lines 310, akin to how a topographical map represents altitude on a two-dimensional surface. As will also be understood, the flux lines 310 illustrated in FIG. 3 are for purposes of illustration; the flux lines 310 may vary based on the relative magnetic strengths, permeabilities, and polarities of the physical components as well as the distances between those components.

Also illustrated is the path 320 that a magnetic receiver 122 follows through the flux lines 310. The path 320 illustrates the portion of the orbit of the magnetic receiver 122 around the driveshaft 121 that is affected by a given driver block 111. The path 320 moves through areas of low flux into areas of higher flux as the orbit of the magnetic receiver 122 moves along the driving magnets 210. Because the path 320 is an arc, and the driving magnets 210 of the driver block 111 are linear, the magnetic receiver 122 will naturally experience magnetic fluxes of higher strength as it nears the driving magnets 210 and of lower strengths as it moves away. Additionally, the field schism caused by the pathway magnetic shield 230*b* causes the flux lines 310 along the path 320 to cluster, so that the magnetic receiver 122 will pass through an area of high flux and several flux changes over a shorter distance than it would otherwise, followed by an area of low flux, before entering the magnetic field of the next driver block 111.

Figure 4:
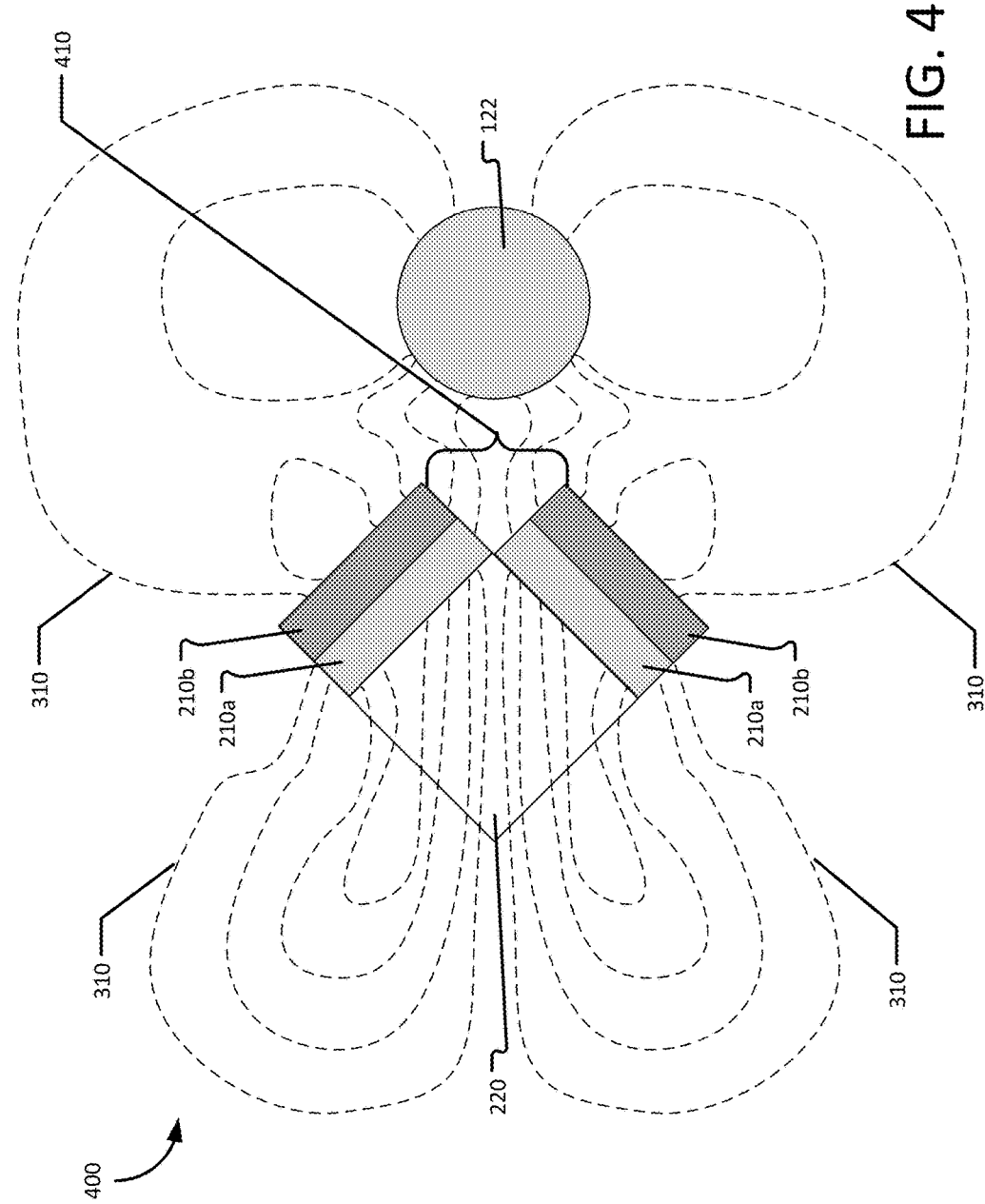
FIG. 4 is an example flux diagram for a side view of a driver block.

FIG. 4 is an example flux diagram 400 for a side view of a driver block 111. In the flux diagram 400, the driving magnets 210, support 220, and magnetic receiver 122 are illustrated in a cut-away view, and the flux lines 310 between the components are illustrated as dashed lines. As will be understood, each flux line 310 represents a pathway having an equivalent flux value along the flux line 310, and flux lines 310 interior to other flux lines 310 represent higher flux values than the exterior flux lines 310, akin to how a topographical map represents altitude on a two-dimensional surface. As will also be understood, the flux lines 310 illustrated in FIG. 4 are for purposes of illustration; the flux lines 310 may vary based on the relative magnetic strengths, permeabilities, and polarities of the physical components as well as the distances between those components.

As illustrated, the magnetic fields generated by the driving magnets 210 interact with the magnetic receiver 122. Due to the magnetic shields 230 shaping and concentrating the magnetic fields of the driving magnets 210, and the strength of a magnetic field varying by distance from its source, the non-parallel movement of the magnetic receiver 122 relative to the driving magnets 210 will cause the magnetic receiver 122 to experience stronger 'pulls' and 'pushes' as it nears the driving magnets 210.

The upper set of driving magnets 210 and the lower set of driving magnets 210 define a channel 410 in which the magnetic receiver 122 will pass in its orbit. The arrangement of the sets of driving magnets 210 relative to one another produces a pinching schism in the presence of the magnetic receiver 122, which serves to aid in guiding and applying magnetic forces to the magnetic receiver 122 from the driving magnets 210. As will be understood, although the sets of driving magnets 210 are illustrated as perpendicular to one another, the sets of driving magnets 210 may also be set at acute or obtuse angles to one another to vary the size of the channel 410 defined or the flux characteristics of the pinching schism.

Figure 5:
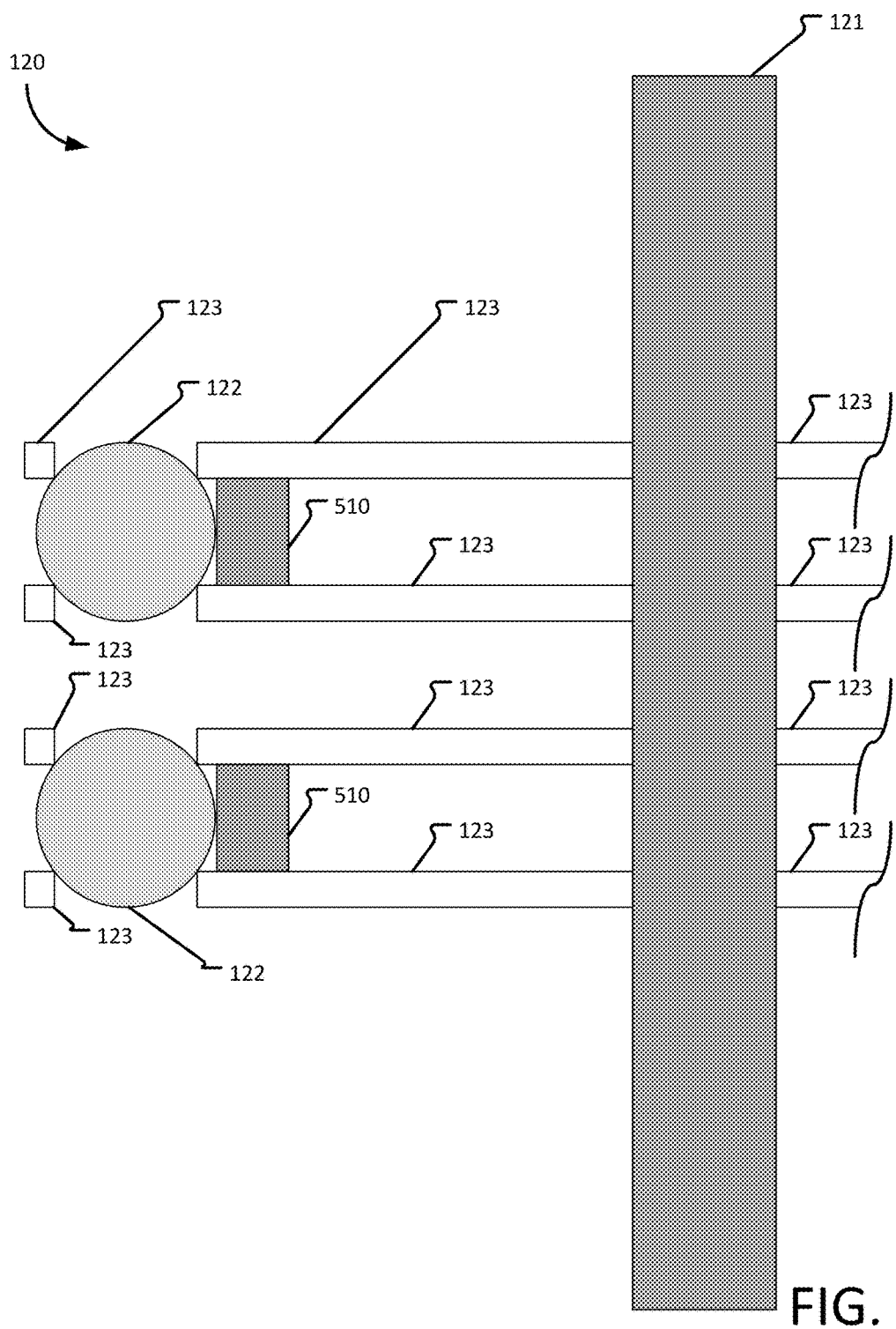
FIG. 5 is an example side view of a cutaway of an example rotational member.

FIG. 5 is an example side view of a cutaway of an example rotational member 120. One of skill in the art will recognize that more or fewer components than those discussed herein may be used, and alternative shapes for the components are possible—the components illustrated in FIG. 5 are presented for purposes of non-exhaustive explanation within the present disclosure. In various aspects, the rotational member 120 may exhibit radial symmetry (e.g., as illustrated in FIG. 1) or may be asymmetric, therefore only one side of the rotational member 120 is illustrated in FIG. 5, for purposes of improved clarity.

The driveshaft 121 forms the center of the rotational member 120, about which all the other components of the rotational member 120 orbit. The driveshaft 121 is operable to receive an outside force (e.g., from an engine via a gearing assembly) that imparts a rotation to the rotational member 120.

The magnetic receivers 122 are offset from the driveshaft 121 to receiver varying magnetic forces from the drive housing 110 to transfer to the driveshaft 121 over the course of an orbit. In various aspects, the magnetic receivers 122 may be spherical (as illustrated) or cylindrical (including curved shapes with circular, ovoid, and irregular cross-sections, so long as the surface pointed outward from the driveshaft 121 is curved). The magnetic receivers 122 are made of a magnetic material (e.g., iron, $SmCo_5$, $Nd_2Fe_{14}B$), which may or may not be magnetized. In various aspects, a supplementing magnet 510 is held in communication with the magnetic receiver 122 to apply a magnetic field to a non-magnetized magnetic receiver 122. In various aspects, the supplementing magnet 510 is an electromagnet, which may be used to strengthen or weaken a magnetic field generated by a magnetic receiver 122 depending on the direction of rotation of the rotational system is running (e.g., to weaken when the rotational system runs in reverse).

The connector 123 serves to offset the magnetic receivers 122 from the driveshaft 121 and transfer magnetic forces exerted on the magnetic receivers 122 back to the driveshaft 121. In various aspects, the connector 123 may comprise arms or a plate extending from the driveshaft 121, and multiple arms or plates may be installed along the length of the driveshaft 121 to form an array in which multiple magnetic receivers 122 may be positioned along the length of the driveshaft 121. The connector 123 may also comprise multiple arms or define multiple capture points around the circumference of the driveshaft 121 to position multiple magnetic receivers 122 around the driveshaft 121 (see, FIG. 1). The connector 123 is preferably made from a non-magnetic material (e.g., plastic, aluminum), although magnetic materials may also be used.

Although the present disclosure has been described in several examples and aspects, the descriptions of these examples and aspects are not intended to limit or restrict the scope of the present disclosure as claimed in any way. The description provided in this disclosure is considered sufficient to convey possession and enable those of ordinary skill in the art to make and used the best mode of the present disclosure for their applications thereof. Regardless of whether shown or described, separately or in combination, the various features described herein are intended to be selectively included or omitted to produce an aspect with the set of features desirable by the practitioner. Having been provided with the description and illustration of the present disclosure, one of ordinary skill in the art may envision variations modification, and alternate examples that fall within the spirit of the broader inventive concept embodied in the present disclosure.

I claim:

1. A magnetic drive enhancement for improving the efficiency of a rotational system, comprising:
    a plurality of driver blocks arranged to form a drive housing with a polygonal cross section;
    wherein each side of the polygonal cross section of the drive housing is formed by one driver block of the plurality of driver blocks;
    wherein no two of the driver blocks are parallel to one another;
    wherein the driver blocks define a cavity sized to accept a rotational member in communication with the rotational system;
    wherein each given driver block of the plurality of driver blocks comprises:
        a leading magnetic shield, at a first vertex of the polygonal cross section, perpendicular to the side defined by the given driver block;
        a trailing magnetic shield, at a second vertex of the polygonal cross section, perpendicular to the side defined by the given driver block;
        a pathway magnetic shield, connected to the trailing magnetic shield, running parallel to the side defined by the given driver block;
        a first driving magnet, running between the leading magnetic shield and the trailing magnetic shield parallel to the side defined by the given driver block, exterior to the cavity from the pathway magnetic shield; and
        a second driving magnet, connected to the first driving magnet, interior to the cavity from the first driving magnet, aligned so that a second magnetic field produced by the second driving magnet increases a strength of a first magnetic field produced by the first driving magnet, wherein the second driving magnet is positioned on the first driving magnet closer to the trailing magnetic shield than to the leading magnetic shield.

2. The magnetic drive enhancement of claim 1, wherein the rotational member has magnetic properties.

3. The magnetic drive enhancement of claim 1, wherein the rotational member comprises spherical components.

* * * * *